(12) United States Patent
Shimura et al.

(10) Patent No.: US 11,421,124 B2
(45) Date of Patent: Aug. 23, 2022

(54) INK, INK SET, PRINTING METHOD, AND PRINTING DEVICE

(71) Applicant: RICOH COMPANY, LTD., Tokyo (JP)

(72) Inventors: Naoto Shimura, Tokyo (JP); Yuta Nakamura, Kanagawa (JP); Yoshiaki Masuda, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 147 days.

(21) Appl. No.: 16/996,086

(22) Filed: Aug. 18, 2020

(65) Prior Publication Data

US 2021/0062026 A1    Mar. 4, 2021

(30) Foreign Application Priority Data

Aug. 26, 2019   (JP) .............................. JP2019-153661

(51) Int. Cl.
| | | |
|---|---|---|
| C09D 11/38 | (2014.01) | |
| C09D 11/40 | (2014.01) | |
| B41M 5/00 | (2006.01) | |
| C09D 11/102 | (2014.01) | |
| B41J 2/175 | (2006.01) | |
| C09D 11/328 | (2014.01) | |

(52) U.S. Cl.
CPC .............. C09D 11/38 (2013.01); B41J 2/175 (2013.01); B41M 5/0023 (2013.01); C09D 11/102 (2013.01); C09D 11/328 (2013.01); C09D 11/40 (2013.01)

(58) Field of Classification Search
CPC ........ C09D 11/40; C09D 11/322; C09D 1/38; C09D 11/328; C09D 11/102; C09D 11/324; B41J 2/175; B41J 2/01
See application file for complete search history.

(56) References Cited

U.S. PATENT DOCUMENTS

| | | | |
|---|---|---|---|
| 9,010,917 B2* | 4/2015 | Gotou .................. | C09D 11/322 347/100 |
| 2002/0088375 A1* | 7/2002 | Komatsu .............. | C09D 11/324 106/498 |

(Continued)

FOREIGN PATENT DOCUMENTS

| | | |
|---|---|---|
| JP | 2003-096344 | 4/2003 |
| JP | 2003-096345 | 4/2003 |

(Continued)

OTHER PUBLICATIONS

U.S. Office Action dated Jun. 10, 2022, in U.S. Appl. No. 17/021,388, 17 pages.

*Primary Examiner* — John Zimmermann
(74) *Attorney, Agent, or Firm* — Grüneberg and Myers, PLLC (57) ABSTRACT

An ink contains a coloring material, an organic solvent, a resin, and a compound represented by Chemical Formula 1 having a weight average molecular weight of from 390 to 610,

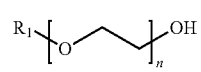

Chemical Formula 1 where $R_1$ represents a hydrocarbon group, and n represents an integer of 2 or greater.

19 Claims, 2 Drawing Sheets

(56) References Cited

U.S. PATENT DOCUMENTS

| | | | |
|---|---|---|---|
| 2003/0097960 A1* | 5/2003 | Ito | C09D 11/322 |
| | | | 106/31.86 |
| 2003/0107632 A1 | 6/2003 | Arita et al. | |
| 2005/0054751 A1 | 3/2005 | Namba et al. | |
| 2008/0273045 A1 | 11/2008 | Morohoshi et al. | |
| 2009/0234065 A1* | 9/2009 | Sasada | C09D 11/40 |
| | | | 524/558 |
| 2016/0023456 A1* | 1/2016 | Yoneyama | B41M 5/5254 |
| | | | 347/20 |
| 2018/0362790 A1* | 12/2018 | Watanabe | C09D 11/08 |

FOREIGN PATENT DOCUMENTS

| | | |
|---|---|---|
| JP | 2003-226827 | 8/2003 |
| JP | 2004-225018 | 8/2004 |
| JP | 2005-220352 | 8/2005 |
| JP | 2011-094082 | 5/2011 |
| JP | 2014-530259 | 11/2014 |
| JP | 2018-104490 | 7/2018 |
| WO | WO2013/036283 A1 | 3/2013 |

* cited by examiner

INK, INK SET, PRINTING METHOD, AND PRINTING DEVICE

CROSS-REFERENCE TO RELATED APPLICATIONS

This patent application is based on and claims priority pursuant to 35 U.S.C. § 119 to Japanese Patent Application No. 2019-153661, filed on Aug. 26, 2019 in the Japan Patent Office, the entire disclosure of which is hereby incorporated by reference herein.

BACKGROUND

Technical Field

The present disclosure relates to an ink, an ink set, a printing method, a printing method, and a printing device.

There are inks for printing on non-permeable recording media. Low-polarity recording media made of polyvinyl chloride (PVC), polypropylene (PP), polyethylene (PE), or another material are used as the non-permeable recording medium in many occasions. These inks include solvent-based inks, ultraviolet (UV) inks, and others.

Aqueous inks containing substantial water are repelled by such recording media because water has a high polarity.

For printing on a low-polarity recording medium with an aqueous ink for inkjet printers, the dot diameter of the ink decreases as the medium repels the ink, which reduces image gloss.

SUMMARY

According to embodiments of the present disclosure, an ink is provided which contains a coloring material, an organic solvent, a resin, and a compound represented by Chemical Formula 1 having a weight average molecular weight of from 390 to 610, Chemical Formula 1 where $R_1$ represents a hydrocarbon group, and n represents an integer of 2 or greater.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Low-polarity recording media made of polyvinyl chloride (PVC), polypropylene (PP), polyethylene (PE), or another material are used as the non-permeable recording medium in many occasions.

These inks include solvent-based inks, ultraviolet (UV) inks, and others.

Aqueous inks containing substantial water are repelled by such recording media because water has a high polarity.

For printing on a low-polarity recording medium with an aqueous ink for inkjet printers, the dot diameter of the ink decreases as the medium repels the ink, which reduces image gloss.

In attempts to solve this problem, inks have been proposed in JP-2005-220352-A1 and JP-2011-94082-A1 which contain resins and enable direct printing on a low-polarity recording medium by controlling the boiling point of the organic solvent used or the acid value, glass transition temperature, and weight average molecular weight of the resins.

According to the present disclosure, an ink is provided which increases the dot diameter of the ink, enhances the degree of image gloss, and reduces occurrence of beading.

Ink

The ink of the present disclosure contains a coloring material, an organic solvent, a resin, a compound represented by Chemical Formula 1 having a weight average molecular weight of from 390 to 610, and other optional components.

Chemical Formula 1

In the Chemical Formula 1, $R_1$ represents ethyl group, n represents an integer of from 2 to 6.

Existing techniques such as controlling the boiling point of an organic solvent in an ink or the acid value, the glass transition temperature, and the weight average molecular weight of a resin in the ink fail to produce inks that sufficiently spread inks over a low-polarity recording medium. Images produced still suffer low dot diameter, which degrades image gloss.

In the present disclosure, inclusion of a compound represented by Chemical Formula 1 having a weight average molecular weight of from 390 to 610 in an ink containing a coloring material, an organic solvent, and a resin suitably controls the wettability of the ink and increases the dot diameter of the ink, which enhances image gloss and reduces the occurrence of beading, even when the ink is applied onto a low-polarity recording medium as a print substrate.

The ink of the present disclosure contains a coloring material, an organic solvent, a resin, the compound represented by Chemical Formula 1, and other optional components.

Compound Represented by Chemical Formula 1

One of the hydrocarbon groups of $R_1$ in Chemical Formula 1 is an alkyl group. The alkyl group preferably includes a linear, side-chained, or cyclic alkyl group having 1 to 30 carbon atoms and more preferably 10 to 18 carbon atoms.

Specific examples includes, but are not limited to, a methyl group, ethyl group, propyl group, butyl group, isopropyl group, isobutyl group, pentyl group, hexyl group, heptyl group, ethylhexyl group, octyl group, decyl group, dodecyl group, 2-butyloctyl group, octadecyl group, cyclopropyl group, cyclo butyl group, cyclopentyl group, cyclohexyl group, and adamantyl group.

The alkyl group may be substituted with a substitution group.

Specific examples of the substitution group include, but are not limited to, a halogen atom, a nitro group, a cyano group, an alkyl group such as a methyl group and an ethyl group, an alkoxy group such as a methoxy group and an ethoxy group, an aryloxy group such as a phenoxy group, an aryl group such as a phenyl group and a naphthyl group, and an aralkyl group such as a benzyl group and a phenethyl group.

"n" in the Chemical Formula 1 represents an integer of 2 or greater and is suitable when the weight average molecular weight is from 390 to 610 and preferably from 3 to 15. It is more preferable to use a mixture containing a compound corresponding to n being from 5 to 15.

The compound represented by Chemical Formula 1 is preferably represented by Chemical Formula 2 to increase the dot diameter of the ink.

Chemical Formula 2

In Chemical Formula 2, n represents an integer of 2 or greater.

It is possible to use any suitable procured or synthetic products as the compound represented by the Chemical Formula 1 having a weight average molecular weight of from 390 to 610. Specific examples of the procured products include, but are not limited to, Surfynol 420 (weight average molecular weight (Mw) of 401, manufactured by Nissin Chemical co., ltd.), Triton HW1000 (Mw of 515, manufactured by The Dow Chemical Company), and Brij L4 (Mw of 603, manufactured by Sigma-Aldrich Corporation). These can be used alone or in combination.

The proportion of the compound represented by the Chemical Formula 1 having an Mw of from 390 to 610 in the total content of the ink is preferably from 0.01 to 5.0 percent by mass, more preferably from 0.05 to 3.2 percent by mass, and furthermore preferably from 0.1 to 2.4 percent by mass. Of these, the proportion is particularly preferably from 0.5 to 3.2 percent by mass to suitably increase the dot diameter of an ink. The proportion is preferably from 0.5 to 2.0 percent by mass to obtain a robust ink film.

The structures of the compounds represented by Chemical Formula 1 and Chemical Formula 2 can be confirmed by IR or NMR. The Mw of the compound represented by Chemical Formula 1 and n can be measured by the following device under the following conditions.

Analyzer: Mass analyzer (MALDI-TOFMS, autoflexIII, manufactured by Bruker Corporation)

Preparation of sample liquid: A compound for evaluation: Compound for evaluation is dissolved in methanol to a concentration of 1,000 ppm.

Preparation of matrix solution: A TA solution of 2.5-dihydroxybenzoic acid (DHB) at 10 mg/mL is prepared. The TA solution refers to a liquid mixture of trifluoro acetic acid aqueous solution at 0.1 percent by mass mixed with acetonitrile at a volume ratio of 2:1.

Preparation of measuring liquid: The sample solution, the matrix solution, and an ethanol saturated solution of NaCl are mixed at a volume ratio of 1:4:1.

Measuring method: 1 µl of the measuring solution is added dropwise to a MALDI plate and the obtained dried solution is subject to MALDI measuring.

Detection ion: Cationic ion

Organic Solvent

There is no specific limitation on the type of the organic solvent used in the present disclosure. For example, water-soluble organic solvents are suitable. Examples include, but are not limited to, polyols, ethers such as polyol alkylethers and polyol arylethers, nitrogen-containing heterocyclic compounds, amides, amines, and sulfur-containing compounds.

Specific examples of the water-soluble organic solvent include, but are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 degrees C. or lower to serve as a humectant and impart a good drying property.

Polyol compounds having eight or more carbon atoms and glycol ether compounds are also suitable.

Specific examples of the polyol compounds having eight or more carbon atoms include, but are not limited to, 2-ethyl-1,3-hexane diol and 2,2,4-trimethyl-1,3-pentane diol.

Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

The polyhydric alcohol or polyol compounds having eight or more carbon atoms and glycolether compounds enhance permeability of ink for paper used as a recording medium.

The proportion of the organic solvent in the ink has no particular limit and can be suitably selected to suit to a particular application.

In terms of drying and discharging reliability of the ink, the proportion is preferably from 10 to 60 percent by mass and more preferably from 20 to 60 percent by mass.

Water

As the water, pure water and hyper pure water such as deionized water, ultrafiltered water, reverse osmosis water, and distilled water can be used.

The proportion of water in the ink is not particularly limited and can be suitably selected to suit to a particular application. In terms of drying and discharging reliability of the ink, the proportion is preferably from 10 to 90 percent by mass and more preferably from 20 to 60 percent by mass.

Coloring Material

The coloring material has no particular limit. For example, pigments and dyes are usable.

Inorganic pigments or organic pigments can be used as the pigment. These can be used alone or in combination. In addition, it is possible to use a mixed crystal.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 42, 44, 79, and 142, C.I. Acid Red 52, 80, 82, 249, 254, and 289, C.I. Acid Blue 9, 45, and 249, C.I. Acid Black 1, 2, 24, and 94, C. 1. Food Black 1, 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material of the ink is preferably from 0.1 to 15 percent by mass and more preferably from 1 to 10 percent by mass in terms of image density, fixability, and discharging stability.

The ink is obtained by introducing a hydrophilic functional group into a pigment to prepare a self-dispersible pigment, coating the surface of a pigment with a resin followed by dispersion, or using a dispersant to disperse a pigment.

To prepare a self-dispersible pigment by introducing a hydrophilic functional group into a pigment, for example, it is possible to add a functional group such as a sulfone group and a carboxyl group to the pigment (e.g., carbon) to disperse the pigment in water.

One way to disperse a resin by coating the surface thereof is to encapsulate a pigment in a microcapsule to make it disperse in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

A known dispersant of a small molecular weight or a large molecular weight, which is represented by a surfactant, can be used to disperse the coloring material in the white ink.

It is possible to select an anionic surfactant, a cationic surfactant, a nonionic surfactant, an amphoteric surfactant, or others depending on a pigment.

Also, a nonionic surfactant (RT-100, manufactured by TAKEMOTO OIL & FAT CO., LTD.) and a formalin condensate of naphthalene sodium sulfonate are suitably used as the dispersant.

Those can be used alone or in combination.

Pigment Dispersion

The ink can be obtained by mixing a pigment with materials such as water and an organic solvent. It is also possible to mix a pigment with water, a dispersant, and other substances to prepare a pigment dispersion and thereafter mix the pigment dispersion with materials such as water and an organic solvent to manufacture an ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency in the maximum number conversion is preferably 20 to 500 nm and more preferably 20 to 150 nm to improve dispersion stability of the pigment and ameliorate discharging stability and image quality such as image density. The particle diameter of the pigment can be analyzed using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with an instrument such as filter and a centrifuge to remove coarse particles followed by deaerateing.

Resin

The type of the resin contained in the ink has no particular limit and can be suitably selected to suit to a particular application. Examples include, but are not limited to, polyurethane resins, polyester resins, acrylic-based resins, vinyl acetate-based resins, styrene-based resins, butadiene-based resins, styrene-butadiene-based resins, vinylchloride-based resins, acrylic styrene-based resins, acrylic silicone-based resins, and fluorochemical resins.

Resin particles formed of these resins may be also used. It is possible to mix a resin emulsion in which such resin particles are dispersed in water as a dispersion medium with materials such as a coloring material and an organic solvent to obtain an ink. The resin particle can be synthesized or procured. The resin particle can be used alone or in combination.

The mean volume diameter (volume average particle diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of the ink, it is preferably from 1 to 30 percent by mass and more preferably from 5 to 20 percent by mass of the total amount of the ink.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes particles such as resin particles and pigment particles. The particle diameter can be measured by using a particle size analyzer (Nanotrac Wave-UT151, manufactured by MicrotracBEL Corp).

Additive

The ink may furthermore optionally contain additives such as a surfactant, a defoaming agent, a preservative and fungicide, a corrosion inhibitor, and a pH regulator.

The compound represented by Chemical Formula 1 and the compound represented by Chemical Formula 2 serve as surfactants and can be used in combination with existing surfactants in the present disclosure. The surfactants below can be used in combination.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, surfactants not decomposable in a high pH environment are preferable. Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. In particular, silicone-based surfactants having a polyoxyethylene group or a polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluoro-surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkylether acetates, dodecyl benzene sulfonates, laurates, and salts of polyoxyethylene alkylether sulfates.

These can be used alone or in combination.

The silicone-based surfactant is not particularly limited and can be suitably selected to suit to a particular application. Examples include, but are not limited to, side-chain modified polydimethylsiloxane, both-terminal modified polydimethylsiloxane, one terminal-modified polydimethyl siloxane, and side chain both terminal modified polydimethylsiloxane. Of these, polyether-modified silicon-based surfactants having a polyoxyethylene group or polyoxyethylene polyoxypropylene group as the modification group are particularly preferable because these demonstrate good properties as aqueous surfactants.

Such surfactants can be synthesized or commercially procured. Products are available from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

In Chemical formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Toshiba Silicone Co. Ltd.).

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain.

Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

Chemical Formula F-1

In the Chemical Formula F-1, "m" is preferably 0 or an integer of from 1 to 10 and "n" is preferably 0 or an integer of from 1 to 40.

Chemical Formula F-2

In the compound represented by the Chemical Formula F-2, Y represents H or $C_nF_{2n+1}$, where n represents an integer of from 1 to 6, or $CH_2CH(OH)CH_2$—$CnF_{2n+1}$, where n represents an integer of from 4 to 6, or $C_pH_{2p+1}$, where p is an integer of from 1 to 19. a represents an integer of from 4 to 14.

The fluorochemical surfactants can be procured.

Specific examples of the procurable products include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FS-3100, FS-34, and FS-300 (manufactured by The Chemours Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, in particular, coloring, and improvement on permeation to paper, wettability, and uniform dying property.

Defoaming Agent

The defoaming agent has no particular limit and examples thereof include, but are not limited to silicon-based defoaming agents, polyether-based defoaming agents, and aliphatic acid ester-based defoaming agents. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-on.

Corrosion Inhibitor

The corrosion inhibitor has no particular limitation. Examples are acid sulfites and sodium thiosulfates.

pH Regulator

The pH regulator has no particular limit as long as it can control pH to not lower than 7. Specific examples include, but are not limited to, amines such as diethanol amine and triethanol amine.

Properties of the ink are not particularly limited and can be suitably selected to suit to a particular application. For example, the viscosity of the ink is preferable in the following ranges.

The viscosity of the ink at 25 degrees C. is preferably from 1 to 1,000 mPa·s to enhance printing density and text quality and more preferably from 3 to 30 mPa·s to obtain good dischargeability in inkjet printing. Viscosity can be measured by an instrument such as a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes.

There is no specific limit to the selection of colors of the ink for inkjet for use in the present disclosure. For example, yellow, magenta, cyan, and black are suitable.

Ink Set

The ink set of the present disclosure is a combination of at least two types of the inks (e.g., any combination of a black ink, a cyan ink, a magenta ink, a yellow ink, and a white ink) of the present disclosure.

Multiple color images can be recorded with an ink set containing at least two types of such colors. When an ink set having all the colors (e.g., a set of a black ink, a cyan ink, a magenta ink, a yellow ink, and a white ink) is used, full color images can be formed. The white ink is suitable as the background.

Recording Medium

The recording medium is not particularly limited. Materials such as plain paper, gloss paper, special paper, and cloth are usable. Also, good images can be formed on a non-permeable substrate.

The non-permeable substrate has a surface with low moisture permeability and absorbency and includes a material having a number of hollow spaces inside that are not open to the outside. To be more quantitative, the substrate has a water-absorbency of 10 or less mL/m² from the start of the contact until 30 msec$^{1/2}$ later according to Bristow's method.

The non-permeable substrate includes plastic films such as polyvinyl chloride resin film, polyethylene terephthalate (PET) film, polypropylene film, polyethylene film, and polycarbonate film.

The recording media are not limited to typical recording media and suitably include building materials such as wall paper, floor material, and tiles, cloth for apparel such as T-shirts, textile, and leather. The configuration of the paths through which the recording medium is conveyed can be changed to use materials such as ceramics, glass, and metal.

Recorded Matter

The recorded matter of the present disclosure includes a recording medium and an image formed on the recording medium with the ink of the present disclosure.

The above-mentioned can be used as the recording medium.

The usage of the ink of the present disclosure is not particularly limited and can be widely applied.

Specific examples of such methods include, but are not limited to, an inkjet recording method, blade coating method, gravure coating method, bar coating method, roll coating method, dip coating method, curtain coating method, slide coating method, die coating method, and spray coating method. The ink of the present disclosure is suitably used for inkjet recording methods because the ink containing the compound represented by Chemical Formula 1 has excellent discharging stability.

Inkjet Recording Device and Inkjet Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices such as 3D printers and additive manufacturing devices.

In the present disclosure, the recording (printing) device and the recording (printing) method respectively represent a device capable of discharging ink and liquids such as various processing liquids to a recording medium and a method of recording utilizing such a device. The method includes applying the ink of the present disclosure to a recording medium (a print substrate) preferably with a discharging head. The print substrate includes a low-polarity recording medium.

The recording device includes the ink of the present disclosure, an ink container containing the ink, and a head that discharges the ink and may further optionally include a device relating to feeding, conveying, and ejecting a recording medium and other devices such as a pre-processing device and a post-processing device.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. It is possible to heat and dry a recording medium before, during, and after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head moves and a line type device in which the discharging head is not moved, unless otherwise specified.

Furthermore, in addition to the desktop type, this recording device includes a device capable of printing images on a wide recording medium such as A0 and a continuous printer capable of using continuous paper reeled up in a roll form as recording media.

Figure 1:
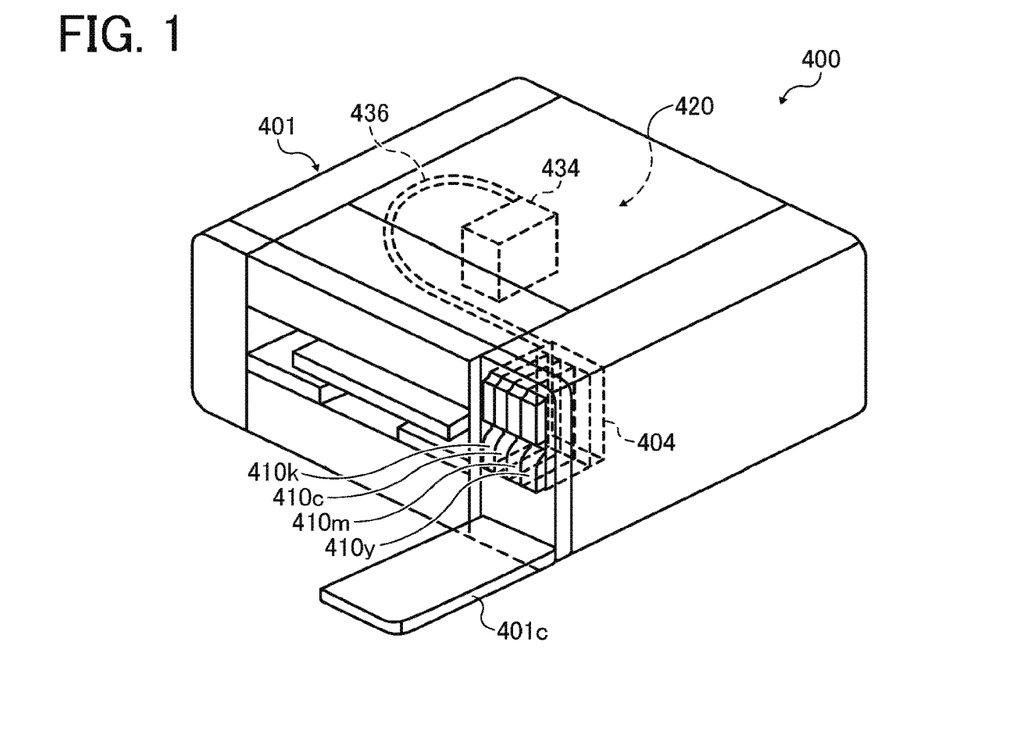
FIG. 1 is a diagram illustrating a perspective view of an example of a printing device.
Figure 2:
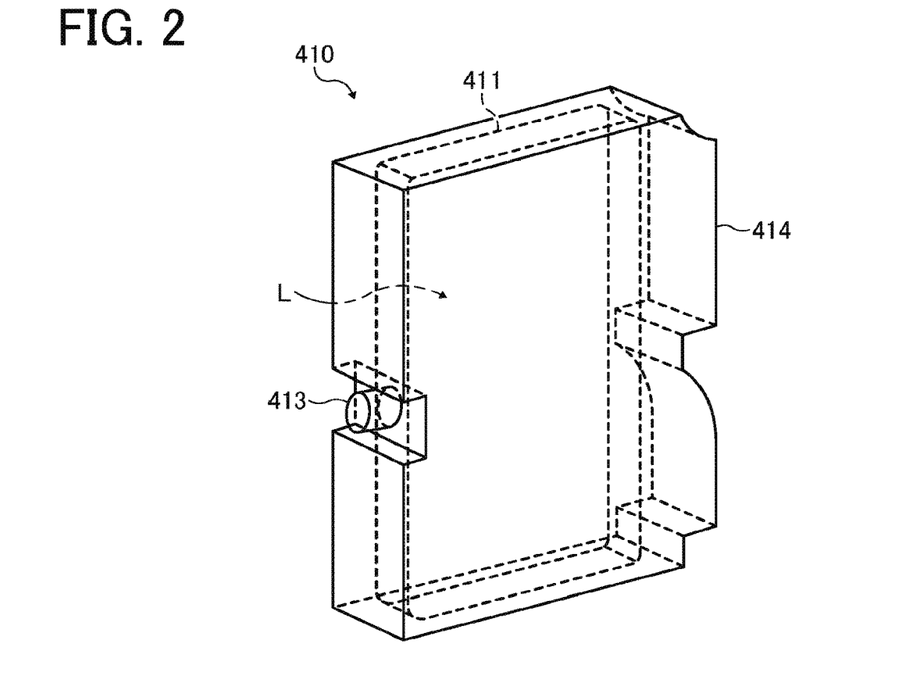
FIG. 2 is a diagram illustrating a perspective view of an example of the tank of a printing device.

The recording device (printing device) is described using an example with reference to FIG. 1 and FIG. 2. FIG. 1 is a diagram illustrating a perspective view of the printing device. FIG. 2 is a diagram illustrating a perspective view of a tank. An image forming device 400, which is an embodiment of the printing device, is a serial type image forming device. A mechanical assembly 420 is disposed in an exterior 401 of the image forming device 400. Each ink accommodating unit (container) 411 of each main tank (ink accommodating unit) 410 (410k, 410c, 410m, and 410y) for each color of black (K), cyan (C), magenta (M), and yellow (Y) is made of, for example, a packaging member such as aluminum laminate film. The ink accommodating unit 411 is housed in, for example, a plastic container housing unit 414 and L represents liquid contained in the ink accommodating unit 411. The tank 410 is used as an ink cartridge for each color. A cartridge holder 404 is disposed on the rear side of the opening formed when a cover 401c is opened. The cartridge holder 404 is detachably attached to the tank 410. In this configuration, each ink discharging outlet 413 of the tank 410 communicates with a discharging head 434 for each color via a supplying tube 436 for each color and the ink can be discharged from the discharging head 434 to a recording medium.

Terms such as image forming, recording, printing, and print used in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1 of Liquid Dispersion of Pigment

Preparation of Liquid Dispersion of Black Pigment

The following raw materials were preliminarily mixed and dispersed in a circulation manner for seven hours by a disk-type bead mill (KDL type, manufactured by SHIN-MARU ENTERPRISES CORPORATION; Media: zirconia ball having a diameter of 0.3 mm) to obtain a liquid dispersion of black pigment.

Composition

| | |
|---|---|
| Carbon black pigment (Product: Monarch 800, manufactured by Cabot Corporation): | 15 parts |
| Anionic surfactant (Pionine A-51-B, manufactured by TAKEMOTO OIL & FAT CO., LTD.): | 2 parts |
| Deionized water | 83 parts |

Preparation Example 2 of Liquid Dispersion of Pigment

Preparation of Liquid Dispersion of Cyan Pigment

A liquid dispersion of cyan pigment was prepared in the same manner as in Preparation Example 1 of Liquid Dispersion of Pigment except that the carbon black pigment was replaced with Pigment Blue 15:3 (LIONOL BLUE FG-7351, manufactured by Toyo Ink SC Holdings Co., Ltd.).

Preparation Example 3 of Liquid Dispersion of Pigment

Preparation of Liquid Dispersion of Magenta Pigment A liquid dispersion of magenta pigment was prepared in the same manner as in Preparation Example 1 of Liquid Dispersion of Pigment except that the carbon black pigment was replaced with Pigment Red 122 (Toner Magenta E002, manufactured by Clariant Japan K.K.).

Preparation Example 4 of Liquid Dispersion of Pigment

Preparation Example of Liquid Dispersion of Yellow Pigment

A liquid dispersion of yellow pigment was prepared in the same manner as in Preparation Example 1 of Liquid Dispersion of Pigment except that the carbon black pigment was replaced with Pigment Yellow 74 (Fast Yellow 531, manufactured by Dainichiseika Color & Chemicals Mfg. Co., Ltd.).

Manufacturing Example 1 of Ink

Manufacturing of Ink A

Deionized water was added as a balance to the following formulation so as to be 100 parts in total. Subsequent to preparation, the resulting substance was mixed and stirred followed by filtering with a filter having an average pore diameter of 5 μm (Minisart®, manufactured by Sartorius Stedim Biotech GmbH) to obtain ink A.

Ink Recipe

| | |
|---|---|
| Liquid dispersion of black pigment mentioned above: | 20 parts |
| Polyurethane resin: SUPERFLEX 300 (manufactured by DKS Co. Ltd., solid content concentration of 30 percent by mass): | 6.0 parts |
| Triton HW1000 (weight average molecular weight (Mw) of 515, manufactured by The Dow Chemical Company): | 1.2 parts |
| BYK 3485 (silicone-based surfactant, manufactured by BYK Chemie): | 0.3 parts |
| 1,3-Propane diol: | 5 parts |
| 2-Ethyl-1,3-hexane diol: | 8 parts |
| 3-Methoxy-N,N-dimethyl propionamide (Equamide ™ M100, manufactured by Idemitsu Kosan Co., Ltd.): | 10 parts |
| PROXEL LV (preservatives and fungicides, manufactured by AVECIA GROUP): | 0.1 parts |
| Deionized water: balance (100 parts by mass in total) | |

Manufacturing Examples 2 to 20 of Ink

Manufacturing of Ink B to Ink T

Ink B to Ink T were manufactured in the same manner as in Manufacturing Example 1 except that the formulation was changed to those shown in Tables 1 to 4. The proportion in Tables 1 to 4 is represented in solid content.

TABLE 1

| | | Ink | | | | | |
|---|---|---|---|---|---|---|---|
| | | A | B | C | D | E | F |
| Coloring material | Liquid dispersion of black pigment | 20 | | | | | 20 |
| | Liquid dispersion of cyan pigment | | | | | 20 | |

TABLE 1-continued

| | | Ink | | | | | |
|---|---|---|---|---|---|---|---|
| | | A | B | C | D | E | F |
| | Liquid dispersion of magenta pigment | | 20 | 20 | | | |
| | Liquid dispersion of yellow pigment | | | | 20 | | |
| Resin | Polyurethane resin (SUPERFLEX ® 300) | 6.0 | 6.0 | | | | |
| | Polyurethane resin (HYDRAN HW-340) | | | 7.0 | 7.0 | | |
| | Fluororesin (AF1600) | | | | | 6.0 | 6.0 |
| Compound represented by Chemical Formula 1 | Triton HW1000 (Mw = 515) | 1.2 | 1.2 | | | 1.6 | 1.6 |
| | Brij L4 (Mw = 603) | | | 2.0 | 2.0 | | |
| | Surfynol 420 (Mw = 401) | | | | | | |
| | Tergitol TMN-10 (Mw = 756) | | | | | | |
| | Tergitol TMN-6 (Mw = 649) | | | | | | |
| Surfactant | BYK 348 | 0.3 | 0.3 | 0.1 | 0.1 | 0.1 | 0.1 |
| Organic solvent | 1,2-Propane diol | | 3 | 1 | | 8 | |
| | 1,3-Propane diol | 5 | 3 | | 3 | | |
| | 1,3-Butane diol | | | 5 | 3 | | 8 |
| | 2-Eethyl-1,3-hexanediol | 8 | 6 | | 7 | 4 | |
| | 3-Methyl-1,5-pentane diol | | | 8 | | 4 | 6 |
| | 3-Methoxy-N,N-dimethyl propionamide | 10 | 10 | | 5 | | 8 |
| | 3-Butoxy-N,N-dimethyl propionamide | | | 8 | 5 | 7 | |
| Preservatives and fungicides | PROXEL LV | 0.1 | 0.1 | 0.1 | 0.1 | 0.1 | 0.1 |
| Water | Highly pure water | Balance | Balance | Balance | Balance | Balance | Balance |
| | Total (percent by mass) | 100 | 100 | 100 | 100 | 100 | 100 |

TABLE 2

| | | Ink | | | | | |
|---|---|---|---|---|---|---|---|
| | | G | H | I | J | K | L |
| Coloring material | Liquid dispersion of black pigment | | 20 | | 20 | | 20 |
| | Cyan pigment liquid dispersion | 20 | | 20 | | | |
| | Magenta pigment liquid dispersion | | | | | | |
| | Yellow pigment liquid dispersion | | | | | 20 | |
| Resin | Polyurethane resin (SUPERFLEX ® 300) | | | | | | |
| | Polyurethane resin (HYDRAN HW-340) | | | 7.0 | 7.0 | | |
| | Fluororesin (AF1600) | 5.0 | 5.0 | | | 4.0 | 4.0 |
| Compound represented by Chemical Formula 1 | Triton HW1000 (Mw = 515) | | | 0.03 | 0.03 | | |
| | Brij L4 (Mw = 603) | | | | | | |
| | Surfynol 420 (Mw = 401) | 1.0 | 1.0 | | | | |
| | Tergitol TMN-10 (Mw = 756) | | | 0.5 | 0.5 | 1.0 | 1.0 |
| | Tergitol TMN-6 (Mw = 649) | | | | | | |
| Surfactant | BYK 348 | 0.1 | 0.1 | 0.2 | 0.2 | 0.2 | 0.2 |
| Organic solvent | 1,2-Propane diol | 8 | | 8 | | | |
| | 1,3-Propane diol | | | | | 5 | 1 |
| | 1,3-Butane diol | | 8 | | 8 | 1 | 5 |
| | 2-Ethyl-1,3-hexane diol | 4 | | 4 | | 3 | 3 |

TABLE 2-continued

|  |  | Ink G | Ink H | Ink I | Ink J | Ink K | Ink L |
|---|---|---|---|---|---|---|---|
|  | 3-Methyl-1,5-pentane diol | 4 | 6 | 4 | 6 | 3 | 3 |
|  | 3-Methoxy-N,N-dimethyl propionamide |  | 8 |  | 8 |  |  |
|  | 3-Butoxy-N,N-dimethyl propionamide | 7 |  |  |  | 10 | 10 |
| Preservatives and fungicides | PROXEL LV | 0.1 | 0.1 | 0.1 | 0.1 | 0.1 | 0.1 |
| Water | Highly pure water | Balance | Balance | Balance | Balance | Balance | Balance |
|  | Total (percent by mass) | 100 | 100 | 100 | 100 | 100 | 100 |

TABLE 3

|  |  | Ink M | Ink N |
|---|---|---|---|
| Coloring material | Liquid dispersion of black pigment |  | 20 |
|  | Cyan pigment liquid dispersion |  |  |
|  | Magenta pigment liquid dispersion |  |  |
|  | Yellow pigment liquid dispersion | 20 |  |
| Resin | Polyurethane resin (SUPERFLEX ® 300) |  |  |
|  | Polyurethane resin (HYDRAN HW-340) |  |  |
|  | Fluororesin (AF1600) |  |  |
| Compound represented by Chemical Formula 1 | Triton HW1000 (Mw = 515) | 0.8 | 0.8 |
|  | Brij L4 (Mw = 603) |  |  |
|  | Surfynol 420 (Mw = 401) |  |  |
|  | Tergitol TMN-10 (Mw = 756) |  |  |
|  | Tergitol TMN-6 (Mw = 649) |  |  |
| Surfactant | BYK 348 | 0.2 | 0.2 |
| Organic solvent | 1,2-Propane diol |  |  |
|  | 1,3-Propane diol | 5 | 1 |
|  | 1,3-Butane diol | 1 | 5 |
|  | 2-Ethyl-1,3-hexane diol | 3 | 3 |
|  | 3-Methyl-1,5-pentane diol | 3 | 3 |
|  | 3-Methoxy-N,N-dimethyl propionamide |  |  |
|  | 3-Butoxy-N,N-dimethyl propionamide | 10 | 10 |
| Preservatives and fungicides | PROXEL LV | 0.1 | 0.1 |
| Water | Highly pure water | Balance | Balance |
|  | Total (percent by mass) | 100 | 100 |

TABLE 4

|  |  | Ink O | Ink P | Ink Q | Ink R | Ink S | Ink T |
|---|---|---|---|---|---|---|---|
| Coloring material | Liquid dispersion of black pigment |  |  |  | 20 |  |  |
|  | Liquid dispersion of cyan pigment | 20 |  | 20 |  |  | 20 |
|  | Liquid dispersion of magenta pigment |  | 20 |  |  | 20 |  |
|  | Liquid dispersion of yellow pigment |  |  |  |  |  |  |
| Resin | Polyurethane resin (SUPERFLEX ® 300) | 10.0 | 10.0 |  |  | 7.0 | 7.0 |
|  | Polyurethane resin (HYDRAN HW-340) |  |  | 5.0 | 5.0 |  |  |
|  | Fluororesin (AF1600) |  |  |  |  |  |  |

TABLE 4-continued

| | | \multicolumn{6}{c}{Ink} | | | | | |
|---|---|---|---|---|---|---|---|
| | | O | P | Q | R | S | T |
| Compound represented by Chemical Formula 1 | Triton HW1000 (Mw = 515) | | | | | | |
| | Brji L4 (Mw = 603) | | | 0.1 | 0.1 | | |
| | Surfynol 420 (Mw = 401) | 3.2 | 3.2 | | | | |
| | Tergitol TMN-10 (Mw = 756) | | | | | | |
| | Tergitol TMN-6 (Mw = 649) | | | | | 1.0 | 1.0 |
| Surfactant | BYK 348 | | | 0.4 | 0.4 | 0.2 | 0.2 |
| Organic solvent | 1,2-Propane diol | | 3 | 5 | | 5 | 5 |
| | 1,3-Propane diol | 3 | 3 | | 7 | | 6 |
| | 1,3-Butane diol | 3 | | 3 | | 5 | |
| | 2-Ethyl-1,3-hexane diol | | | | 3 | 4 | 4 |
| | 3-Methyl-1,5-pentane diol | 5 | 5 | 3 | | 4 | 4 |
| | 3-Methoxy-N,N-dimethyl propionamide | 5 | | 10 | 10 | | |
| | 3-Butoxy-N,N-dimethyl propionamide | | 5 | | | 5 | 5 |
| Preservatives and fungicides | PROXEL LV | 0.1 | 0.1 | 0.1 | 0.1 | 0.1 | 0.1 |
| Water | Highly pure water | Balance | Balance | Balance | Balance | Balance | Balance |
| Total (percent by mass) | | 100 | 100 | 100 | 100 | 100 | 100 |

The details of each component in Tables 1 to 4 are as follows.

Resin

Polyurethane resin (HYDRAN HW-340, concentration of solid portion: 25 percent by mass, solvent: water, manufactured by DIC Corporation)

Fluororesin (AF1600), available from Dupont-Mitsui Fluorochemicals Co., Ltd.) Compound Represented by Chemical Formula 1

Brji L4 (weight average molecular weight (Mw)=603, manufactured by Sigma-Aldrich Corporation)

Surfynol 420 (Mw=401, manufactured by Nissin Chemical co., ltd.) Compound Represented by Chemical Formula 2

Triton HW1000 (Mw=515, manufactured by The Dow Chemical Company

Comparative Compound for Compound represented by Chemical Formula 1

The structure of the comparative compound was represented by Chemical Formula 2 and had an Mw outside the range of from 390 to 610.

Tergitol TMN-10 (Mw=756, manufactured by The Dow Chemical Company)

Tergitol TMN-6 (Mw=649, manufactured by The Dow Chemical Company)

Organic Solvent 1,2-Propane diol (Propylene glycol, manufactured by ADEKA CORPORATION)

1,3-butane diol (1,3-butane diol, manufactured by Daicel Corporation)

3-Methyl-1,5-pentane diol (MPD, manufactured by KURARAY CO., LTD.)

3-Butoxy-N,N-dimethyl propionamide (Equamide™ B100, manufactured by Idemitsu Kosan Co., Ltd.)

Examples 1 to 9 and Comparative Examples 1 to 3

Each ink obtained was combined as shown in Table 5 to obtain ink sets. The dot diameter, image gloss, and beading were evaluated for each ink set. The results are shown in Table 5.

Evaluation on Dot Diameter

An inkjet printer (machine remodeled based on IPSiO GXe 5500, manufactured by Ricoh Co., Ltd.) was filled with each ink of each ink set, printed a nozzle check pattern on OK TopKote+(manufactured by OJI PAPER CO., LTD.) and dried and fixed it by passage through a heated wind drying unit at 70 degrees C. The diameter of isolated dots was photographed by a digital microscope (manufactured by KEYENCE CORPORATION) at 450× magnification to obtain an image followed by measuring the dot diameter.

The dot diameter graded A or B is usable for practical purpose.

Evaluation Criteria

A: 100 μm or greater

B: 90 to less than 100 μm

C: 80 to less than 90 μm

D: Less than 80 μm

Evaluation of Degree of Image Gloss

An inkjet printer (machine remodeled based on IPSiO GXe 5500, manufactured by Ricoh Co., Ltd.) was filled with ink of each ink set, printed a solid image having a resolution of 600 dpi×600 dpi on polyvinyl chloride film (CPPVWP1300, manufactured by SAKURAI CO., LTD.) and dried and fixed it by passage through a heated wind drying unit at 70 degrees C.

Figure 3:
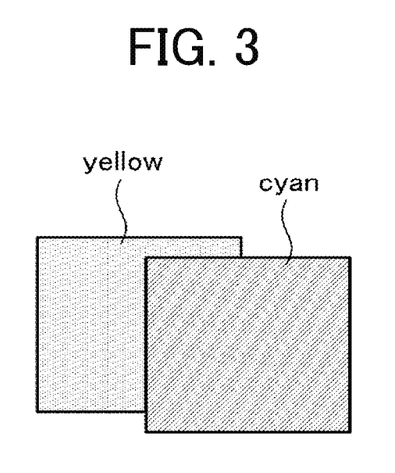
FIG. 3 is a diagram illustrating a method of forming solid images with an ink set containing two types of inks.

When a solid image is formed with an ink set containing multiple types of inks, the solid image included regions for solid images formed with each ink and other regions region for a solid image overlapped with multiple types of inks at a ratio of one to one. In a case of an ink set containing a cyan ink and a yellow ink for example, a solid image was formed with the cyan ink and the yellow ink in an overlapping manner as illustrated in FIG. 3.

The obtained solid image was subjected to measuring the gloss at 60 degree with a gloss meter (4501, manufactured by BYK Gardener) and evaluated according to the following criteria. The solid image graded A or B is usable for practical purpose.

Evaluation Criteria

A: Gloss at 60° was 100 percent or greater
B: Gloss at 60° from 80 to less than 100 percent
C: Gloss at 60° from 60 to less than 80 percent
D: Gloss at 60° was less than 60 percent Evaluation on Beading An inkjet printer (machine remodeled based on IPSiO GXe 5500, manufactured by Ricoh Co., Ltd.) was filled with ink of each ink set, printed a solid image having a resolution of 600 dpi×600 dpi on polyvinyl chloride film (CPPVWP1300, manufactured by SAKURAI CO., LTD.) and dried and fixed it by passage through a heated wind drying unit at 70 degrees C. Solid images were formed with the ink set containing the multiple types of inks in the same manner as in Evaluation of Degree of Image Gloss. The solid image was visually observed and the ink set was evaluated on beading according to the following criteria. The solid image graded A or B is usable for practical purpose.

Evaluation Criteria

A: Excellent (No beading present at all)
B: Good (Beading slightly present)
C: Fair (Beading present)
D: Poor (Beading significantly present)

TABLE 5

| | | Evaluation result | | |
|---|---|---|---|---|
| Ink set | Ink No. | Dot diameter | Image glossiness | Beading |
| Example 1 | A | A | A | A |
| | B | | | |
| Example 2 | C | B | B | A |
| | D | | | |
| Example 3 | E | A | A | B |
| | F | | | |
| Example 4 | G | B | B | B |
| | H | | | |
| Example 5 | I | B | B | A |
| | J | | | |
| Example 6 | O | A | B | B |
| | P | | | |
| Example 7 | Q | B | B | B |
| | R | | | |
| Comparative Example 1 | K | C | D | B |
| | L | | | |
| Comparative Example 2 | M | B | B | D |
| | N | | | |
| Comparative Example 3 | S | C | D | B |
| | T | | | |
| Example 8 | A | A | A | A |
| Example 9 | C | B | B | B |
| | D | | | |
| | I | | | |

Aspects of the present disclosure are, for example, as follows.

1. An ink contains a coloring material, an organic solvent, a resin, and a compound represented by Chemical Formula 1 having a weight average molecular weight of from 390 to 610.

Chemical Formula 1

$$R_1 \left[ O \diagup \diagup \right]_n OH$$

In Chemical Formula 1, $R_1$ represents a hydrocarbon group. n represents an integer of 2 or greater.

2. The ink according to 1 mentioned above, wherein n in Chemical Formula 1 represents an integer of from 3 to 15.

3. The ink according to 1 or 2 mentioned above, wherein the compound represented by Chemical Formula 1 is the compound represented by Chemical Formula 2.

Chemical Formula 2

$$HO \diagup \diagup \left[ O \diagdown \diagdown \diagdown \right]_n$$

In Chemical Formula 2, n represents an integer of 2 or greater.

4. The ink according to any one of 1 to 3 mentioned above, wherein the proportion of the compound represented by Chemical Formula 1 is from 0.05 to 3.2 percent by mass.

5. The ink according to any one of 1 to 4 mentioned above, wherein the resin contains a polyurethane resin.

6. The ink according to any one of 1 to 5 mentioned above, wherein the ink is applicable to an inkjet method.

7. The ink according to any one of 1 to 6 mentioned above, wherein the ink contains at least one member selected from the group consisting of a black ink, a cyan ink, a magenta ink, a yellow ink, and a white ink.

8. An ink set contains at least two types of the inks of 1 mentioned above.

9. A printing method includes applying the ink of any one of 1 to 7 mentioned above to a print substrate.

10. The printing method according to any one of 9 mentioned above, wherein the applying includes discharging the ink with a discharging head.

11. The printing method according to 9 or 10 mentioned above, wherein the print substrate includes a low-polarity recording medium.

12. A printing device includes the ink of any one of 1 to 7 mentioned above, a container that contains the ink, and a discharging head configured to discharge the ink.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink, comprising:
   a coloring material;
   an organic solvent;
   a resin; and
   a compound represented by Chemical Formula 1 having
      a weight average molecular weight of from 390 to 610, Chemical Formula 1 where $R_1$ represents an alkyl group which may be substituted with at least one group selected from the group consisting of a halogen, a nitro, a cyano, an alkyl, an alkoxy, an aryloxy, an aryl group and an aralkyl group, and n represents an integer of 2 or greater.

2. The ink according to claim 1, wherein n in Chemical Formula 1 represent an integer of from 3 to 15.

3. The ink according to claim 1, wherein the compound is represented by Chemical Formula 2, Chemical Formula 2 where n represents an integer of 2 or greater.

4. The ink according to claim 1, wherein a proportion of the compound represented by Chemical Formula 1 is from 0.05 to 3.2 percent by mass.

5. The ink according to claim 1, wherein the resin comprises a polyurethane resin.

6. The ink according to claim 1, wherein the ink is applicable to an inkjet method.

7. The ink according to claim 1, wherein the ink comprises at least one member selected from the group consisting of a black ink, a cyan ink, a magenta ink, a yellow ink, and a white ink.

8. An ink set, comprising:
at least two different types of the ink of claim 1, each having different coloring materials and
at least one other type of the ink of claim 1.

9. A printing method, comprising:
applying the ink of claim 1 to a print substrate.

10. The printing method according to claim 9, wherein the applying includes discharging the ink with a discharging head.

11. The printing method according to claim 9, wherein the print substrate comprises a low-polarity recording medium.

12. A printing device, comprising:
the ink of claim 1;
a container that contains the ink, and
a discharging head configured to discharge the ink.

13. The ink according to claim 1, wherein $R_1$ represents an alkyl group having 1 to 30 carbon atoms.

14. The ink according to claim 1, wherein $R_1$ represents an alkyl group having 10 to 18 carbon atoms.

15. The ink according to claim 1, wherein $R_1$ represents an alkyl group substituted with at least one alkyl group selected from the group consisting of methyl and ethyl.

16. The ink according to claim 1, wherein $R_1$ represents an alkyl group substituted with at least one alkoxy group selected from the group consisting of methoxy and ethoxy.

17. The ink according to claim 1, wherein said organic solvent is a water-soluble organic solvent.

18. The ink according to claim 17, wherein said water-soluble organic solvent is at least one solvent selected from the group consisting of a polyol, an ether, a nitrogen-containing heterocyclic compound, an amide, an amine, and a sulfur-containing compound.

19. The ink according to claim 1, comprising 10-60 percent by mass of said organic solvent.

* * * * *